United States Patent
Liu et al.

(10) Patent No.: US 12,149,980 B2
(45) Date of Patent: Nov. 19, 2024

(54) SYSTEM AND METHOD FOR DYNAMIC ALLOCATION OF RESOURCES

(71) Applicant: T-Mobile USA, Inc., Bellevue, WA (US)

(72) Inventors: Jun Liu, Issaquah, WA (US); Egil Gronstad, Encinitas, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/214,079

(22) Filed: Mar. 26, 2021

(65) Prior Publication Data

US 2022/0312253 A1 Sep. 29, 2022

(51) Int. Cl.
*H04W 28/02* (2009.01)
*H04L 47/6295* (2022.01)

(52) U.S. Cl.
CPC ..... *H04W 28/0205* (2013.01); *H04L 47/6295* (2013.01); *H04W 28/0263* (2013.01)

(58) Field of Classification Search
CPC .......... H04W 28/0205; H04W 28/0263; H04L 47/6295
See application file for complete search history.

(56) References Cited

U.S. PATENT DOCUMENTS

| | | | | |
|---|---|---|---|---|
| 5,347,511 A * | 9/1994 | Gun | ................... | H04Q 11/0478 370/255 |
| 5,592,622 A * | 1/1997 | Isfeld | .................... | G06F 13/387 709/207 |
| 6,680,933 B1 * | 1/2004 | Cheesman | .......... | H04L 12/6402 370/352 |
| 10,447,273 B1 * | 10/2019 | Roberts | ............... | G06F 15/7867 |
| 10,506,558 B2 * | 12/2019 | Zhang | ................... | H04L 41/082 |
| 2002/0116481 A1 * | 8/2002 | Lee | ........................... | H04L 9/40 709/223 |
| 2004/0165528 A1 * | 8/2004 | Li | ......................... | H04L 47/724 370/468 |
| 2005/0003822 A1 * | 1/2005 | Aholainen | ............ | H04W 28/18 455/445 |
| 2008/0075032 A1 * | 3/2008 | Balachandran | ....... | H04W 72/04 455/423 |
| 2012/0057567 A1 * | 3/2012 | Kruglick | ............... | H04W 36/16 370/331 |
| 2016/0135168 A1 * | 5/2016 | Liu | ....................... | H04W 72/51 370/329 |
| 2017/0353849 A1 * | 12/2017 | Lim | ........................ | H04W 8/02 |
| 2020/0084091 A1 * | 3/2020 | Iovene | .................... | H04L 47/83 |
| 2023/0035468 A1 * | 2/2023 | Smith | ................. | H04L 63/0485 |

FOREIGN PATENT DOCUMENTS

EP 3462796 A1 4/2019

OTHER PUBLICATIONS

The Extended European Search Report mailed Aug. 8, 2022 for European Patent Application No. 22160351.7 9 pages.

* cited by examiner

*Primary Examiner* — Stephen J Clawson
(74) *Attorney, Agent, or Firm* — Lee & Hayes, P.C.

(57) ABSTRACT

A mobile network base station equipped with a dynamic domain scheduler configured to dynamically allocate resources to various domains associated with the base station based on real-time usage. Individual domains of the network base station may be configured to prioritize different types of network traffic. In some case, a domain specific scheduler may be associated with each domain in order to balance individual loads within each domain.

20 Claims, 5 Drawing Sheets

SYSTEM AND METHOD FOR DYNAMIC ALLOCATION OF RESOURCES

BACKGROUND

The number of network enabled devices and applications requiring low latency and high reliability is increasing. For example, the network demand and usage associated with autonomous navigation for both land and aerial vehicles has seen exponential growth over the last few years. However, these types of applications often require low latency response and high reliability as the devices and applications are performing real time operations in which any delay may result in damage or physical harm to the devices, environmental objects, and/or humans. However, conventional mobile networks are configured for high throughput applications, such as accessing and streaming content, rather than low latency or high reliability.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Discussed herein are systems and methods associated with a mobile network for dynamically allocating network resources to prioritize low latency and high reliability applications and devices, such as autonomous vehicle navigation, virtual reality (VR) systems, and various internet of things (IOT) operations. Unlike conventional networks, the systems and methods, discussed herein, may be equipped with a dynamic domain scheduler component that in substantially real-time may assign network resources between two or more domains bases at least in part on current usage, traffic, and demand within a coverage area. For example, the dynamic domain scheduler may allocate network resources between a first domain associated with traditional network usage and high throughput application (e.g., content streaming) and a second domain associated with low latency and high reliability associated with more real-time operations, such as autonomous vehicle navigation and VR applications.

In some cases, the dynamic domain scheduler may assign or allocate resources to one domain or another based on the current network load, traffic, and/or usage. For example, the dynamic domain scheduler component may be configured to receive from network devices various tasks and operations to be performed. The various tasks and operations may have an associated network usage request (such as one or more minimum network dependability metrics or one or more desired network dependability metrics). The dynamic domain scheduler may then determine a domain for individual tasks and/or operations, allocate resources to the corresponding domain, and route the task and/or operation to a domain specific scheduler to schedule the task and/or operation with respect to the domain allocated resources.

In some instances, the network usage request may include a throughput metric, a latency metric, a reliability metric, an identifier associated with a requesting application or entity, and the like. For example, the network usage request may indicate that a first latency threshold and in some cases one or more additional latency thresholds, and the dynamic domain scheduler may select a specific domain to route the operations based on the minimum latency and/or the desired latency. In other examples, specific domains may be reserved for specific applications, entities, or types of operations. For example, an entity associated with an autonomous ride sharing platform or aerial vehicle surveillance system may contract with the mobile network to provide customized and/or priority domains or "private" domains. In these cases, the dynamic domain scheduler may assign the operation and network resources based on an identifier of the entity or the application generating the task or operation.

As discussed above, the network resources assigned to one or more domains may be adjusted dynamically. In some cases, the network resources may, by default, be assigned to the first domain associated with the traditional high throughput operations. The dynamic domain scheduler may then re-allocate the resources to the second domain upon demand by a low latency application. In some cases, the dynamic domain scheduler may prioritize resource allocation to the second domain as the low latency operations are often time sensitive and may have safety and health related risks that are not present in the traditional high throughput operations. In some cases, each domain may also be assigned a minimum amount of network resources, such that any particular domain may never be without any allocated resources and, thereby, unable to perform any operations and/or tasks.

In some implementations, the dynamic domain scheduler may be configured to allocate and balance network resources based on the incoming traffic, usage, and type of operations, and individual domain schedulers may be responsible for scheduling operations within a corresponding domain. In this manner, the dynamic domain scheduler may allocate resources and/or route traffic to a particular domain, but the individual domain scheduler may manage the order of operations and schedule conflicts between operations within the corresponding domain.

Figure 1:
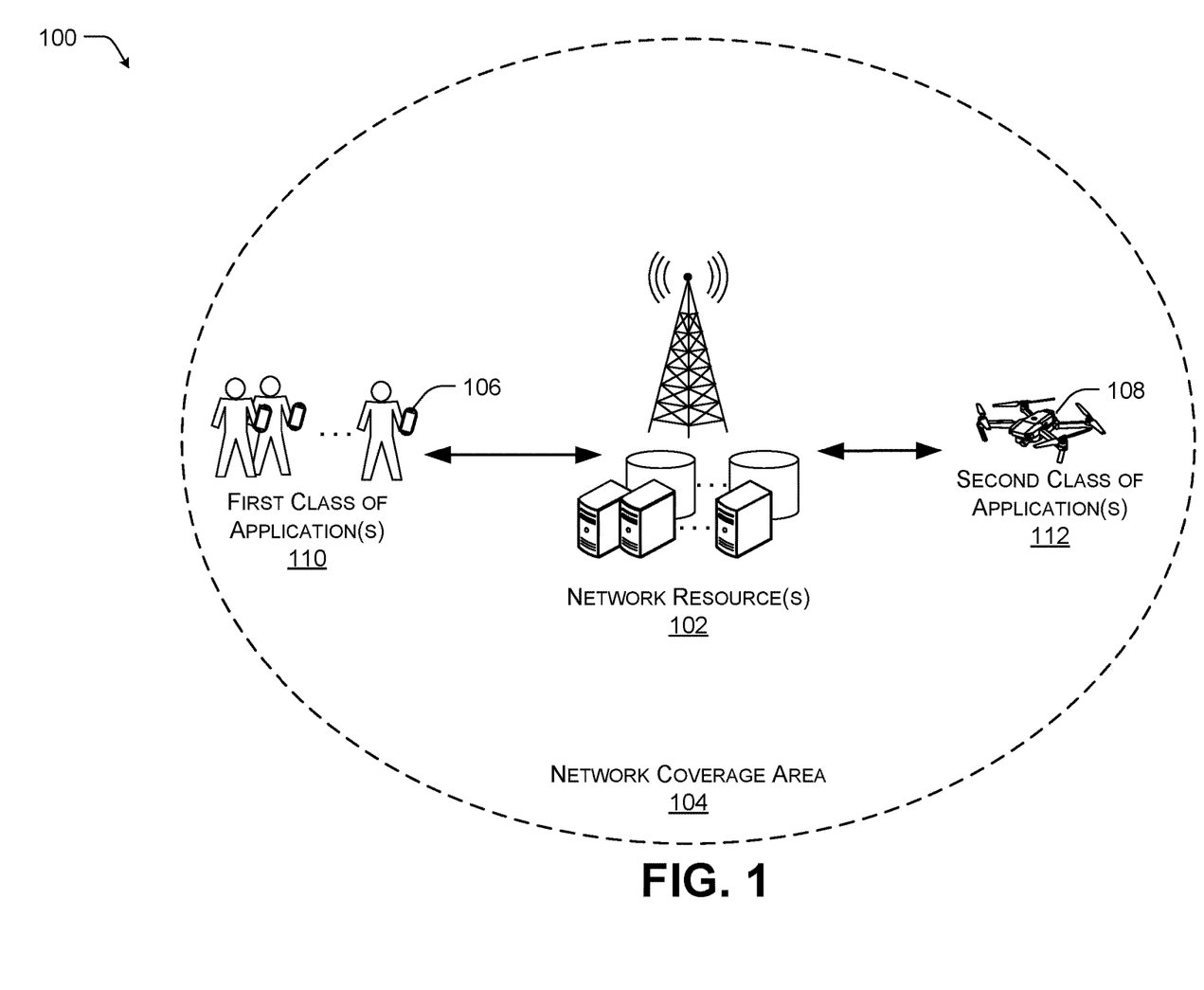
FIG. 1 is an example of a mobile network configured to utilize multiple domains for processing varying types of operations and tasks, in accordance with some examples of the present disclosure.

FIG. 1 is an example of a mobile network 100 configured to utilize multiple domains for processing varying types of operations and tasks, in accordance with some examples of the present disclosure. In the illustrated example, the mobile network 100 generally comprises network resources 102 that provide service for a network coverage area 104. As various devices and systems, such as user equipment 106 and/or autonomous vehicles 108, enter the coverage area 104 the network resources 102 become available to the user equipment 106 and the vehicles 108 to assist with performing various operations and/or tasks.

As discussed above, the network resources 102 within the network coverage area 104 may be dynamically allocated between different domains that have associated schedulers that are configured to provide different levels and types of service. For example, the user equipment 106 may be engaged in a first class of application 110, such as streaming content, via the network resources that benefits from high throughput and finds high latency acceptable (e.g., the content can buffer such that the user experience is not interrupted due to the high latency). On the other hand, the vehicle 108 may be engaged in a second class of application 112, such as autonomous navigation, which benefits from low latency. In this example, the network resources 102 may be partitioned or divided into a first domain associated with high throughput operations and a second domain associated with low latency operations. As such, the dynamic domain scheduler associated with the network resources 102 may both allocate resources between the first domain and the second domain based at least in part on total network resource usage, various priority rules, the type of operations, tasks, or applications, such as 110 or 112, currently utilizing the network resources 102, and the like and route operations associated with the applications 110 and 112 between the resources of the first and second domains.

For example, the dynamic domain scheduler may route operations associated with the user equipment 106 and the first class of application 110 to the first domain, as the application 110 benefit from high throughput. The dynamic domain scheduler may route the operation associated with the vehicle 108 and the second class of applications 112 to the second domain, as the navigation operations benefit from low latency. In this example, the dynamic domain scheduler may allocate a majority of the network resources 102 to the first domain as there are more user equipment 106 engaged in the first class of applications 110 associated with the high throughput of the first domain than the single vehicle 108 engaged in an application 112 associated with the low latency of the second domain. However, it should be understood, that in some instance, such as the illustrated example, the dynamic domain scheduler may prioritize allocation of network resources 102 to the second domain based on the time sensitivity of the operations or traffic associated with the second class of applications 112 (e.g., real-time navigation and collision avoidance decisions are being performed based on the output of the network resources 102).

In the illustrated example, the vehicle 108 may only utilize the network resources 102 for a short period of time, as the vehicle 108 is moving and may simply pass through (e.g., enter then exit) the coverage area 104. Thus, while the dynamic domain scheduler, discussed herein, may prioritize the second domain over the first domain due to the nature of the applications 110 and 112, the dynamic domain scheduler may only allocate resources to the second domain upon request (e.g., upon the vehicle 108 entering the coverage area 104) and re-allocate the resources 102 assigned to the second domain and associated with operations or traffic associated with the vehicle 108 back to the first domain (e.g., the default domain) when the vehicle 108 leaves the coverage area 104. In this manner, network resources 102 are allocated dynamically in real time based on usage, thereby reducing the likelihood that any network resources remains idle when traffic within the coverage area 104 is being dropped as compared with conventional networks that statically allocated resources between domains.

Figure 2:
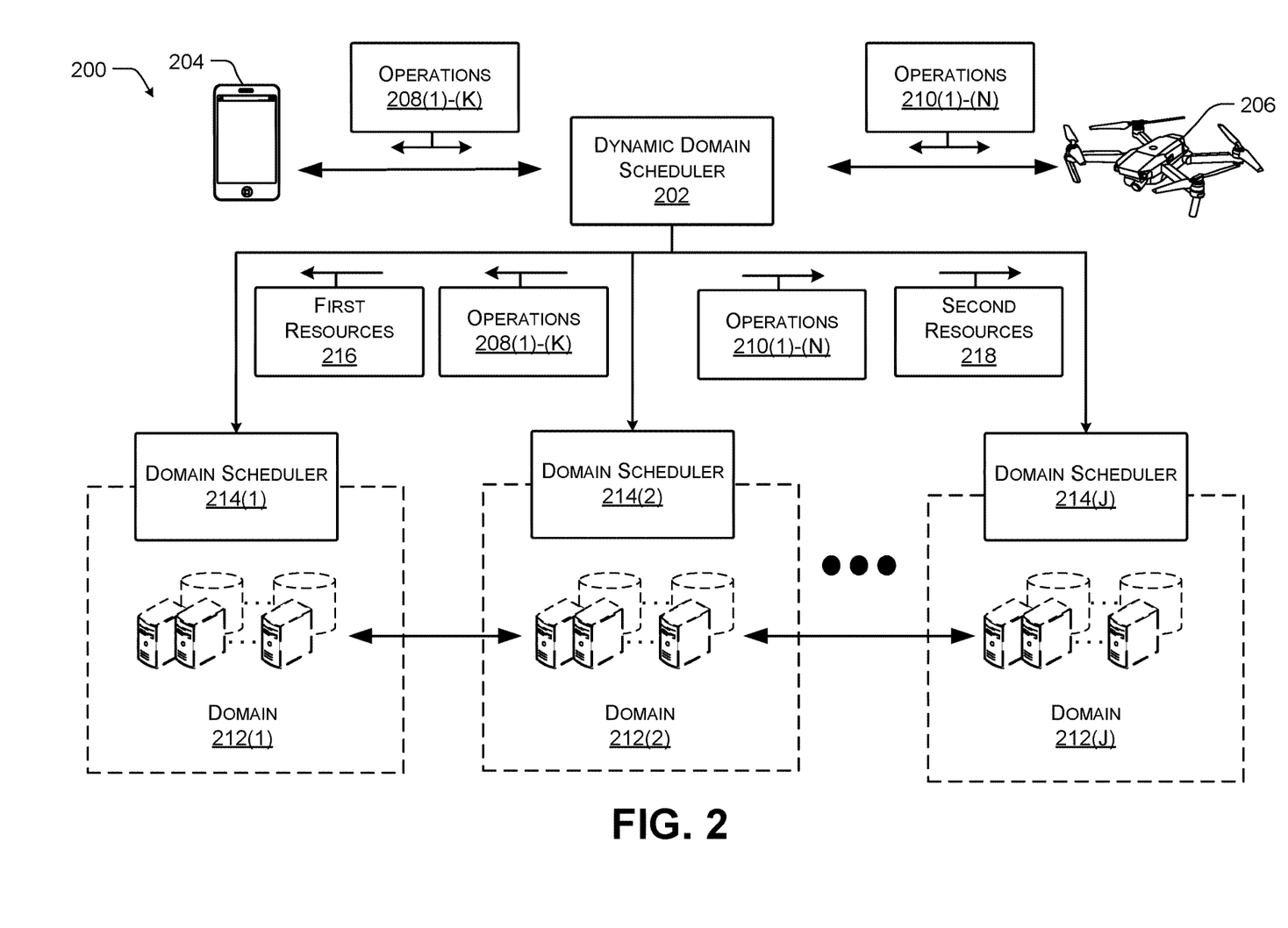
FIG. 2 is an example of a dynamic domain scheduler associated with the mobile network, in accordance with some examples of the present disclosure.

FIG. 2 is an example of a dynamic domain scheduler 202 associated with the mobile network 200, in accordance with some examples of the present disclosure. In the current example, a user equipment 204 and an autonomous vehicle 206 are sending respective operations, 208(1)-(K) and 210(1)-(N), for processing by network resources associated with the mobile network 200. In this example, the operations 208(1)-(K) may be associated with streaming content, accessing data variables via the internet and the like, while the operations 210(1)-(N) may be associated with autonomous navigation, IoT applications, and the like. In other examples, it should be understood that additional devices and systems may utilize the resources of the mobile network 200.

In the illustrated example, the dynamic domain scheduler 202 may be associated with domains 212(1)-212(J). Each of the domains 212(1)-(J) may be associated with predetermined type or class of application and/or specific network dependability metric (e.g., one or more latency thresholds, one or more throughput thresholds, and the like). In some instances, the operations 208 and/or 210 may include a network usage request indicating various desired metrics associated with the network resources. In these instances, the dynamic domain scheduler 202 may assign a domain 212 to the operations 208 and 210 based at least in part on the network dependability metric associated with each domain 212 and the network usage request associated with the operations 208 and 210. For example, the dynamic domain scheduler 202 may compare the network usage request to the various network dependability metrics and select a domain that meets or exceeds the metrics within the network usage request.

Once the dynamic domain scheduler 202 assigns the operations 208 and 210 to a respective domain, such as operations 208 to the domains 212(1) and the operations 210 to the domain 212(J) is shown in the illustrated example, the dynamic domain scheduler 202 may allocate resources 216 and 218 between the domains 212. For example, the dynamic domain scheduler 202 may first allocate resources 216 to the domain 212(J) associated with the low latency operations, then allocate second resources 218 to the domain 212(1) for the operations 208, and finally the dynamic domain scheduler 202 may allocate some resources, if available, to the domain 212(2) as in the current example, the domain 212(2) has no operations or network traffic assigned.

Within each of the domains 212(1)-(J), the network may be equipped with a domain scheduler, such as domain schedulers 214(1)-(J). Each of the individual domain schedulers 214 may be responsible for scheduling tasks and operations from one or more applications or devices with the respective domain 212. In this manner, the domain scheduler 214(1) may drop or prioritize specific operations and/tasks within the domain 212(1), such as if a conflict within the domain 212(1) occurs or the resources assigned to the domain 212(1) are exceeded.

Figure 3:
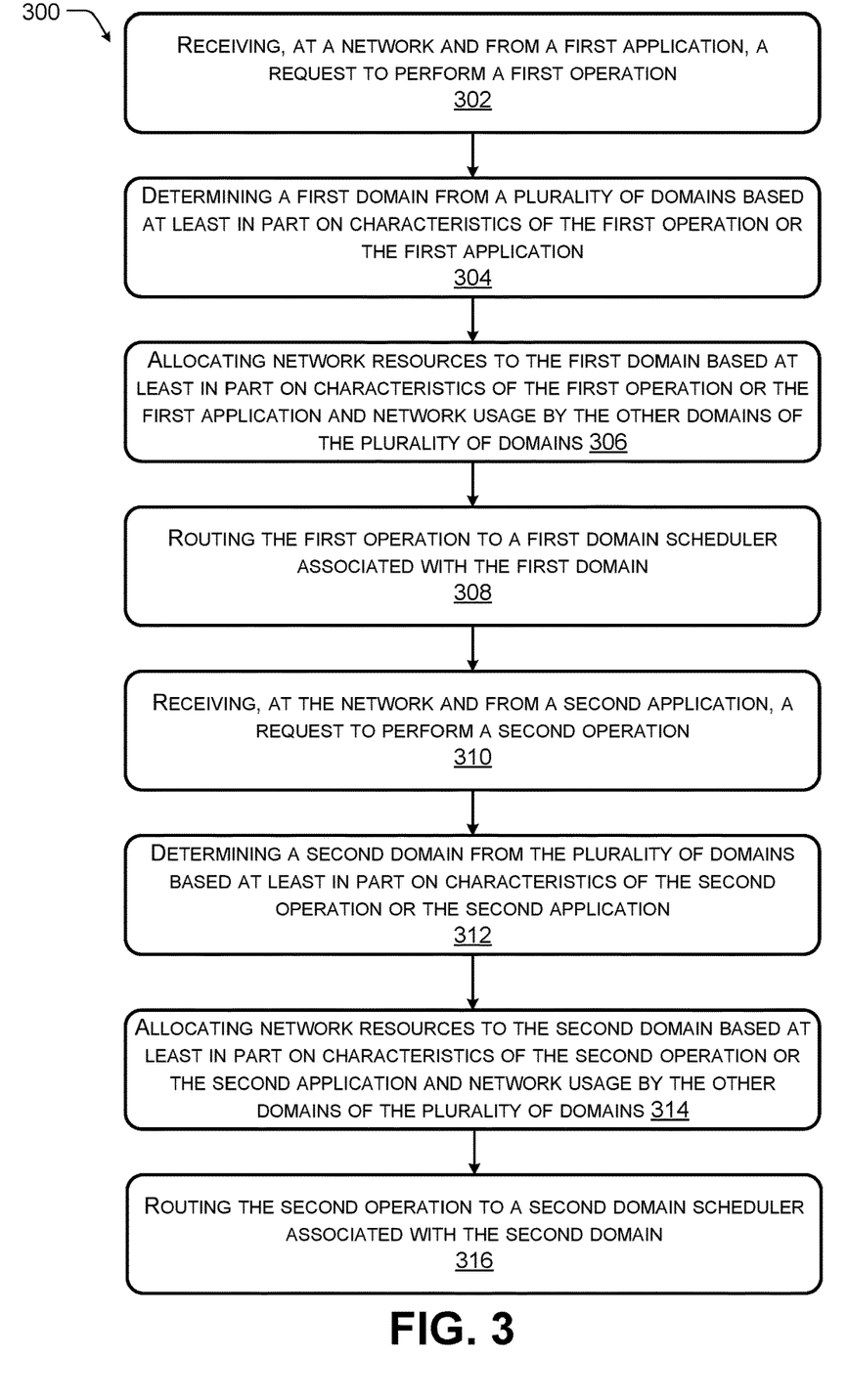
FIG. 3 illustrates an example flow diagram showing an illustrative process associated with dynamic domain scheduling associated with the mobile network of FIGS. 1 and 2, in accordance with some examples of the present disclosure.
Figure 4:
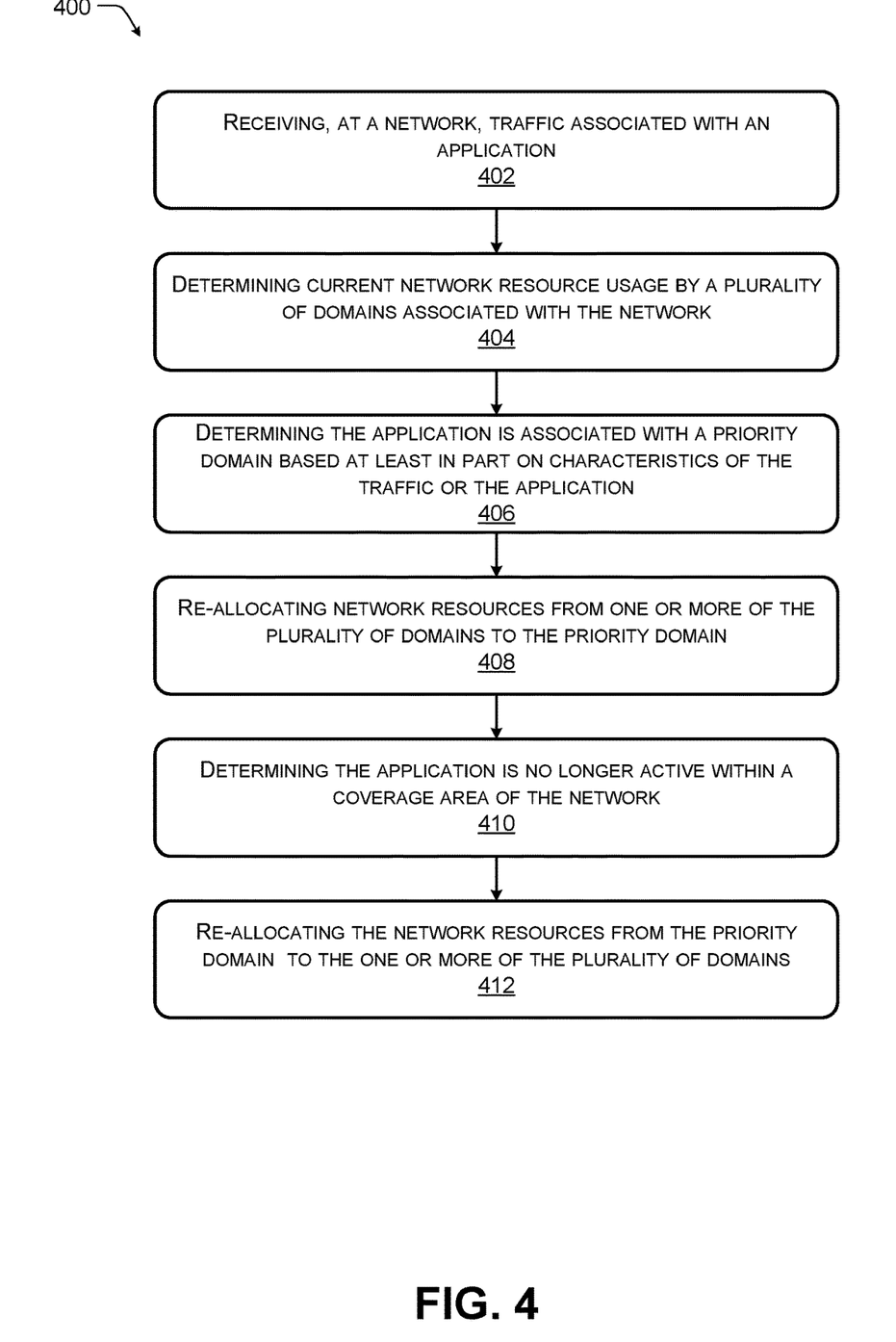
FIG. 4 illustrates another example flow diagram showing an illustrative process associated with dynamic domain scheduling associated with the mobile network of FIGS. 1 and 2, in accordance with some examples of the present disclosure.

FIGS. 3-4 are flow diagrams illustrating example processes associated with the dynamic domain scheduler of FIGS. 1 and 2 according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 illustrates an example flow diagram showing an illustrative process 300 associated with dynamic domain scheduling associated with the mobile networks of FIGS. 1 and 2, in accordance with some examples of the present disclosure. As discussed above, the network resources associated with an area of coverage of a mobile base station may be partitioned or divided into a plurality of domains. Each of the domains may have an associated domain scheduler that prioritizes different network based metrics, such as latency, throughput, reliability and the like. The network resources may also have an associated dynamic domain scheduler which may allocate and re-allocate the network resources between the plurality of domains based on characteristics of the current network traffic and the type of service provided by each individual domain.

At 302, the dynamic domain scheduler associated with the network resources may receive from a first application hosted on a first device a request to perform a first operation. For example, the first device may be a user equipment within the coverage area of the mobile base station. In some case, the request may include a series of operations or a plurality of traffic. In this example, the first operation may be of a first type, such as a high throughput type operation or application.

At 304, the dynamic domain scheduler may determine a first domain from a plurality of domains based at least in part on characteristics of the first operation or the first application. For example, the operation may include a network usage request indicating various desired metrics associated with the network resources, such a minimum latency, minimum throughput, minimum reliability, and the like. In other examples, the dynamic domain scheduler may select the first domain for the first operation based on the type of the first application (e.g., streaming service, text message, data transfer, and the like).

At 306, the dynamic domain scheduler may allocate network resources to the first domain based at least in part on characteristics of the first operation or the first application and network usage by the other domains of the plurality of domains. For example, as the domain the first operation and/or the first application is associated with may be a high throughput, the dynamic domain scheduler may allocate network resources to the first domain if they are available and unused by the other domain as the high throughput operations may not be as time sensitive as other types of network traffic.

At 308, the dynamic domain scheduler may route the first operation to a first domain scheduler associated with the first domain. For example, a domain specific scheduler may be implemented to prioritize and schedule tasks associated with the traffic assigned to the first domain. Thus, if a scheduling conflict occurs, or if there are insufficient resources assigned to the first domain, the domain specific scheduler may decide which packets to drop based on various criteria utilized within each domain. In some cases, each of the domain specific schedulers may utilize similar scheduling criteria, while, in other cases, each of the domain specific schedulers may utilize different criteria based on the characteristics and traffic associated with each domain. In some cases, one or more domains may be configured to request additional resources from the dynamic domain scheduler when scheduling conflicts occur.

At 310, the dynamic domain scheduler may receive from a second application hosted on a second device (or alternatively, in some instances, by a second application on the first device) a request to perform a second operation. For example, the second device may be a virtual reality system within the coverage area of the mobile base station. In some case, the request may include a series of operations or a plurality of traffic, such as streaming or processing three-dimensional data in substantially real-time. In this example, the second operation may be of a second type, such as the low latency type operations associated with virtual reality systems.

At 312, the dynamic domain scheduler may determine a second domain from the plurality of domains based at least in part on characteristics of the second operation or the second application. For example, the second operation may include a network usage request indicating various desired metrics associated with the network resources, such a minimum latency and minimum reliability associated with virtual reality systems. In other examples, the dynamic domain scheduler may select the second domain for the second operation based on the type of the second application (e.g., navigation, video conferencing, virtual reality, and the like).

At 314, the dynamic domain scheduler may allocate network resources to the second domain based at least in part on characteristics of the second operation or the second application and network usage by the other domains of the plurality of domains. For instance, in this example, as the second operation is associated with a low latency application (e.g., virtual reality systems), the dynamic domain scheduler may assign resources from the first domain to the second domain as the operations and traffic associated with the second domain may be more time sensitive than those of the first domain.

At 316, the dynamic domain scheduler may route the second operation to a second domain scheduler associated with the second domain. For example, as discussed above, the second domain may also include a domain specific scheduler implemented to prioritize and schedule tasks associated with the traffic assigned to the second domain. Thus, if a scheduling conflict occurs or if there are insufficient resources assigned to the second domain, the second domain specific scheduler may decide which packets to drop based on various criteria associated with the second domain. For instance, in this example, the second domain scheduler may prioritize traffic associated with autonomous navigation applications over traffic associated with virtual reality systems or video conferencing.

FIG. 4 illustrates another example flow diagram showing an illustrative process 400 associated with dynamic domain scheduling associated with the mobile networks of FIGS. 1 and 2, in accordance with some examples of the present disclosure. In some cases, the network resources available within a coverage area of a mobile base station may be by default or primarily assigned to or allocated to a first domain associated with typical traffic that is generated by a majority of the users, such as text or data messaging, internet browsing, cloud-based content consumption, gaming, and the like. In these examples, the other domains associated with the coverage area may have priority over the first domain when traffic associated with one of the other domains is present within the coverage area.

At 402, a dynamic domain scheduler associated with the network resources of the coverage area may receive traffic associated with an application. In this example, the application may be associated with time sensitive traffic, such as virtual or video conferencing, navigation, or the like.

At 404, the dynamic domain scheduler may determine current network resource usage by a plurality of domains associated with the network. For example, the dynamic domain scheduler may identify any resources that are currently not being consumed by the associated domains.

At 406, the dynamic domain scheduler may determine the application is associated with a priority domain based at least in part on the characteristics of the traffic or the application. For example, the dynamic domain scheduler may determine the priority domain based on an identity of the application, an entity associated with the application, the particular processes associated with the operation or task, and the like. In some cases, the traffic may also include one or more network usage requests specifying requested metrics and the dynamic domain scheduler may assign the priority domain based on the requested metrics.

At 408, the dynamic domain scheduler may re-allocate network resources from one or more of the plurality of domains to the priority domain. For instance, the priority domain may only have resources assigned while a qualifying application is active within the coverage area to reduce the likelihood of dropped traffic when resources are unused. In this case, the dynamic domain scheduler may assign resources that are currently associated with a default domain to the priority domain while the application is active within the coverage area.

At 410, the dynamic domain scheduler may determine the application is no longer active within the coverage area of the network. For instance, if the application was associated with autonomous navigation or the like, the vehicle may have passed through the coverage area relatively quickly. In some cases, the dynamic domain scheduler may determine the application is no longer active when the network has not received traffic for a predetermined threshold period of time (such as 5 minutes, 10 minutes, 30 minutes, or the like). In one specific example, the dynamic domain scheduler may determine the application is no longer active when the domain specific scheduler reports that the resources may be released back to other domains. For example, the domain specific scheduler may determine the traffic associated with the application has ceased or otherwise expired for the predetermined period of time and, in response, notify the dynamic domain scheduler that the resources may be re-allocated.

At 412, the dynamic domain scheduler may re-allocate the network resources from the priority domain to the one or more of the plurality of domains. In some cases, the dynamic domain scheduler may return the network resources to a default domain or to another domain that is requesting resources as the resources are no longer being consumed with respect to the priority domain.

Figure 5:
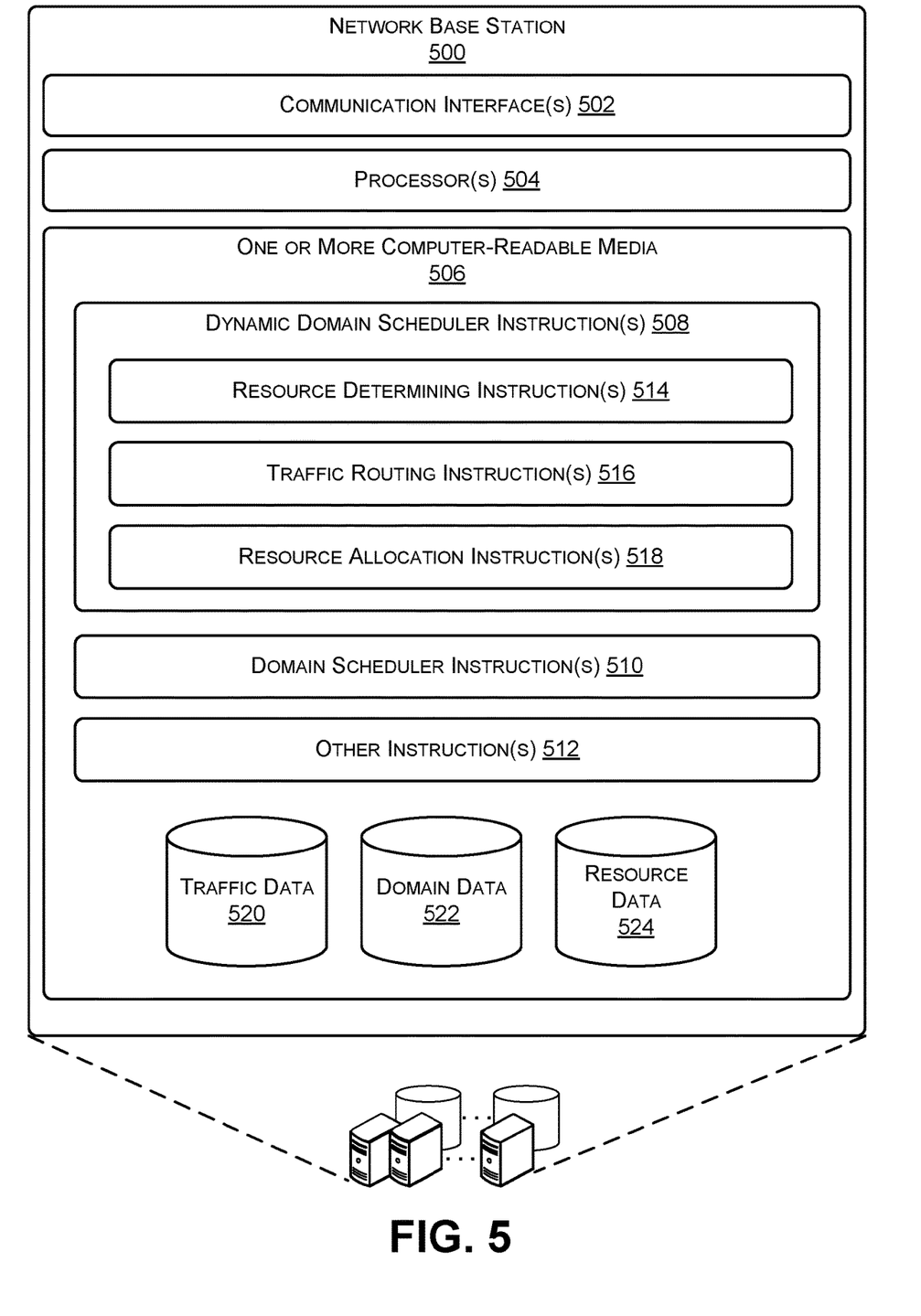
FIG. 5 illustrates an example hardware associated with the mobile network base station, in accordance with some examples of the present disclosure.

FIG. 5 illustrates an example hardware associated with the mobile network base station 500, in accordance with some examples of the present disclosure. As discussed above, a dynamic domain scheduler may be used to allocate resources between dynamic domains of the network base station based on, for instance, current usage and traffic. The various domains associated with the base station may be each be associated with traffic or operations that have different priorities and usage characteristics.

In some implementations, the mobile network base station 500 may include one or more communication interfaces 502 configured to facilitate communication between one or more networks, one or more cloud-based systems, and/or one or more devices or user equipment served by the base station, such as location databases, and/or third-party systems. The communication interfaces 502 may also facilitate communication between one or more cellular or mobile communication networks. The communication interfaces 502 may support both wired and wireless connections to various networks, such as cellular networks, radio, WiFi networks, infrared signals, local area networks, wide area networks, the Internet, and so forth. In some cases, the communication interfaces 502 may be configured to receive traffic from multiple network devices, such as user equipment, autonomous vehicles, IoT devices, and the like.

The processor(s) 504 can represent, for example, a central processing unit (CPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. Additionally, each of the processor(s) 504 may possess its own local memory, which also can store program modules, program data, and/or one or more operating systems.

Depending on the exact configuration and type of the mobile network base station 500, the computer-readable media 506, may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media 506 can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 506 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information. Any such non-transitory computer-readable media can be part of the mobile network base station 500.

The computer-readable media 506 can include one or more modules and data structures including, for example, dynamic domain scheduler instructions 508, domain schedulers instructions 510, as well as other instructions 512, such as an operating system. The dynamic domain scheduler instructions 508 may also include various modules or instructions, such as resource determining instructions 514, traffic routing instructions 516, resource allocation instructions 518, and the like.

The one or more modules, instruction sets, and data structures can be in the form of stand-alone applications, productivity applications, an operating system component, or any other application or software module configured to perform operations as described herein. The computer-readable media 506 may also store data, such as traffic data 520, such as incoming traffic or connected device data, domain data 522, such as domain thresholds and priorities, and resource data 514, such as resource allocation and availability.

The dynamic domain scheduler instructions 508 may be configured to determine network resource allocation between two or more dynamically configurable domains associated with the coverage area of the network base station 500. For example, based on current network traffic, the dynamic domain scheduler instructions 508 may allocate, re-allocate, and otherwise adjust the resource assignment between domains to prioritize network resource efficiency and ensure time sensitive operations and tasks are processed in an efficient manner.

For example, the resource determining instructions 514 may be configured to determine assignments or allocation of available network resources between the two or more domains associated with the coverage area of the base station 500. In some cases, individual domains may include one or more thresholds associated with the class or state of the service provided by the individual domain. For instance, a first domain may be associated with high throughput while a second domain may be associated with low latency operations. In still other instances, a third domain may be associated with high reliability and/or low drop rates.

In this example, the resource determining instructions 514 may be configured to monitor the traffic and network resources within the coverage area to maintain a record of the network resource availability within the coverage area. For example, the resource determining instructions 514 may be configured to determine if specific resources are idle and/or otherwise determine and balance loads.

In other examples, specific domains may be reserved for specific applications, entity's, or type of operations. For example, an entity associated with an autonomous ride sharing platform or aerial vehicle surveillance system may contract with the mobile network to provide customized and/or priority domains or "private" domains. In these cases, the traffic routing instructions 516 may assign the operation based on an identifier of the entity or the application generating the task or operation.

The resource allocation instructions 518 may allocate the resources between the domains based on the current traffic load associated with the coverage area of the base station 500. For instance, the network traffic may include various task and operations that each have an associated network usage request (such as one or more minimum network dependability metric or one or more desired network dependability metric). The resource determining instructions 514 may allocate resources based on the network usage request, the amount of traffic assigned by each domain by the traffic routing instructions 516, the available network resources, and the like.

The traffic routing instructions 516 may assign or route the various packets and traffic to one or more domains based on, for instance, the associated network usage request. For instance, the traffic routing instructions 516 may determine a domain for individual tasks and/or operations and route the task and/or operation to a domain specific scheduler 510 to schedule the task and/or operation with respect to the resources allocated to the domain.

The domain schedulers instructions 510 may be assigned to individual domains, such that each domain has an individual domain scheduler. In this manner, the individual domain schedulers instructions 510 associated with a domain may schedule task and operations associated with the incoming traffic in a manner customized for each domain. For instance, a domain scheduler associated with a high throughput domain may schedule operations and tasks in accordance with delivering high throughput perhaps at the expense of latency.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   receiving, at a dynamic domain scheduler of a base station of a network, first traffic associated with a first device in a coverage area of the base station of the network, wherein network resources of the coverage area of the base station are allocated to a plurality of domains of the network associated with corresponding schedulers;
   routing, by the dynamic domain scheduler of the base station of the network, the first traffic to a first scheduler associated with a first domain of the plurality of domains of the network based at least in part on a first characteristic of the first traffic;
   allocating, by the dynamic domain scheduler of the base station of the network, first network resources of the network resources of the coverage area to the first domain from another domain of the plurality of domains of the network based at least in part on a current load of the network and a second characteristic of the first traffic, wherein the other domain of the plurality of domains of the network is associated with another scheduler and the allocating the first network resources to the first domain discontinues the usage of the first network resources by the other scheduler for other domain traffic routed to the other domain and enables the usage of the first network resources by the first scheduler for first domain traffic routed to the first domain including the first traffic;

determining, by the dynamic domain scheduler of the base station of the network, the first device is no longer active within the coverage area of the base station of the network; and in response to the determining the first device is no longer active within the coverage area of the base station of the network, re-allocating, by the dynamic domain scheduler of the base station of the network, the first network resources to the other domain associated with the other scheduler and from which the first network resources were allocated, wherein the re-allocating the first network resources to the first domain discontinues the usage of the first network resources by the first scheduler for the first domain traffic routed to the first domain and enables the usage of the first network resources by the other scheduler for the other domain traffic routed to the other domain.

2. The computer-implemented method as claim 1 recites, further comprising:

receiving, at the dynamic domain scheduler of the network, second traffic associated with a second device in the coverage area of the of the base station of the network;

routing the second traffic to a second scheduler associated with a second domain of the network based at least in part on a characteristic of the second traffic;

allocating the first network resources from the other domain to the second domain based at least in part on a characteristic of the second domain;

determining the second device is no longer active within the coverage area of the of the base station of the network; and re-allocating the first network resources to the other domain.

3. The computer-implemented method as claim 2 recites, wherein the characteristic of the second domain is a priority associated with the second domain over the other domain.

4. The computer-implemented method as claim 1 recites, wherein the first characteristic of the first traffic include at least one of a latency threshold or a throughput threshold.

5. The computer-implemented method as claim 1 recites, wherein allocating the first network resources to the first domain is based at least in part on a characteristic of the first domain.

6. The computer-implemented method as claim 1 recites, wherein the first characteristic of the first traffic and the second characteristic of the first traffic are the same.

7. The computer-implemented method as claim 1 recites, wherein the other domain is a default domain associated with the first network resources.

8. A system comprising:
one or more communication interfaces;
one or more processors; and
non-transitory computer-readable media storing computer-executable instructions, which when executed by the one or more processors cause the one or more processors to perform operations including:

receiving, at a dynamic domain scheduler of a base station of a network, first traffic associated with a first device in a coverage area of the base station of the network, wherein network resources of the coverage area of the base station are allocated to a plurality of domains of the network associated with corresponding schedulers;

determining, by the dynamic domain scheduler of the base station of the network, the first traffic is associated with a low latency application;

allocating, by the dynamic domain scheduler of the base station of the network, first network resources of the network resources of the coverage area of the base station from a second domain of the plurality of domains of the network to a first domain of the plurality of domains of the network, the first domain of the plurality of domains of the network associated with processing low latency traffic, wherein the first domain of the plurality of domains of the network is associated with a first scheduler and the second domain of the plurality of domains of the network is associated with a second scheduler and the allocating the first network resources to the first domain discontinues the usage of the first network resources by the second scheduler for processing second domain traffic routed to the second domain and enables the usage of the first network resources by the first scheduler for processing first domain traffic routed to the first domain including the first traffic; and determining, by the dynamic domain scheduler of the base station of the network, the first device is no longer active within the coverage area of the base station of the network; and allocating, by the dynamic domain scheduler of the base station of the network, the first network resources to the second domain from which the first network resources were allocated in response to the determining the first device is no longer active within the coverage area of the base station of the network, wherein the allocating the first network resources to the second domain discontinues the usage of the first network resources by the first scheduler for processing the first domain traffic routed to the first domain and enables the usage of the first network resources by the second scheduler for processing the second domain traffic routed to the second domain.

9. The system as recited in claim 8, wherein the non-transitory computer-readable media stores additional computer-executable instructions, which when executed by the one or more processors cause the one or more processors to perform operations including:

receiving second traffic associated with a second device that is active in the coverage area of the base station of the network;

determining the second traffic is associated with a high throughput application; and routing the second traffic to a scheduler associated with the second domain of the network in response to the second traffic being associated with the high throughput application.

10. The system as recited in claim 8, wherein the first domain and the low latency application are associated with a particular entity.

11. The system as recited in claim 8, wherein the first domain has a priority access to the network resources of the coverage area of the base station over the second domain.

12. The system as recited in claim 8, wherein the first traffic is time sensitive.

13. The system as recited in claim 8, wherein the non-transitory computer-readable media stores additional computer-executable instructions, which when executed by the one or more processors cause the one or more processors to perform operations including routing the first traffic to the first scheduler associated with the first domain in response to the first traffic being associated with the low latency application.

14. A method comprising:
receiving, at a dynamic domain scheduler of a base station of a network, first traffic associated with a first application that is active in a coverage area of the base station of the network, wherein network resources of the coverage area of the base station are allocated to a plurality of domains of the network associated with corresponding schedulers;
allocating, by the dynamic domain scheduler of the base station of the network, first network resources of the network resources of the coverage area of the base station to a first domain from another domain based at least in part on a current load of the network and a characteristic of the first traffic, wherein the first domain is associated with a first scheduler and the other domain is associated with another scheduler and the allocating the first network resources to the first domain discontinues the usage of the first network resources by the other scheduler for other domain traffic routed to the other domain and enables the usage of the first network resources by the first scheduler for first domain traffic routed to the first domain including the first traffic;
determining the first application is no longer active within the coverage area of the base station of the network; and
allocating the first network resources to the other domain from which the first network resources were allocated in response to the determining the first application is no longer active within the coverage area of the base station of the network, wherein the allocating the first network resources to the other domain discontinues the usage of the first network resources by the first scheduler for the first domain traffic routed to the first domain and enables the usage of the first network resources by the other scheduler for the other domain traffic routed to the other domain.

15. The method as claim 14 recites, further comprising:
receiving, at the dynamic domain scheduler of the network, second traffic associated with a second application that is active in the coverage area of the base station of the network;
allocating the first network resources from the other domain to a second domain based at least in part on a characteristic of the second domain;
determining the second application is no longer active within the coverage area of the base station of the network; and
re-allocating the first network resources to the other domain.

16. The method as claim 15 recites, further comprising:
routing first the traffic to the first scheduler associated with the first domain of the network based at least in part on a first characteristic of the first traffic; and
routing the second traffic to a second scheduler associated with the second domain of the network based at least in part on a second characteristic of the second traffic.

17. The method as claim 16 recites, wherein:
the first domain is associated with a particular entity; and
the first characteristic of the first traffic is an identifier of the particular entity.

18. The method as claim 14 recites, wherein the characteristic of the first traffic is at least one of a latency threshold or a throughput threshold.

19. The method as claim 14 recites, wherein the characteristic of the first domain is a priority associated with the other domain of the network.

20. The method as claim 14 recites, wherein the other domain is a default domain associated with the first network resources.

* * * * *